United States Patent [19]

Barbier

[11] 4,045,282

[45] Aug. 30, 1977

[54] METHOD AND A DEVICE FOR THERMAL MONITORING OF A NUCLEAR REACTOR CORE

[75] Inventor: Georges Barbier, Aix-en-Provence, France

[73] Assignee: Commissariat a l'Energie Atomique, Paris, France

[21] Appl. No.: 661,756

[22] Filed: Feb. 26, 1976

[30] Foreign Application Priority Data

Mar. 4, 1975 France .............................. 75.06746

[51] Int. Cl.² .............................................. G21C 7/00
[52] U.S. Cl. ................................. 176/19 R; 176/24
[58] Field of Search ............... 176/19 R, 19 J, 19 EC, 176/24

[56] References Cited

U.S. PATENT DOCUMENTS

| | | | |
|---|---|---|---|
| 3,042,595 | 7/1962 | Cobb | 176/19 EC |
| 3,114,263 | 12/1963 | McCann | 176/19 J |
| 3,202,804 | 8/1965 | Schlein | 176/24 |
| 3,207,669 | 9/1965 | Fawcett | 176/24 |
| 3,356,577 | 12/1967 | Fishman | 176/24 |
| 3,423,285 | 1/1969 | Curry | 176/24 |
| 3,752,735 | 8/1973 | Musick | 176/19 EC |
| 3,780,292 | 12/1973 | Klar | 176/19 J |

FOREIGN PATENT DOCUMENTS 1,255,928  12/1971  United Kingdom

*Primary Examiner*—Samuel W. Engle
*Assistant Examiner*—Donald P. Walsh
*Attorney, Agent, or Firm*—Cameron, Kerkam, Sutton, Stowell & Stowell

[57] ABSTRACT

Thermal monitoring of a reactor core is carried out by utilizng coolant temperatures detected at the outlets of a plurality of fuel assemblies. The mean value of the "hot" and "cold" core outlet temperatures and the difference between these latter are established at each instant. An analog signal corresponding to the temperature difference between the coolant temperature at the outlet of said assembly and the mean core outlet temperature is delivered in respect of each fuel assembly. The signal is processed in order to initiate the appropriate safety actions.

6 Claims, 1 Drawing Figure

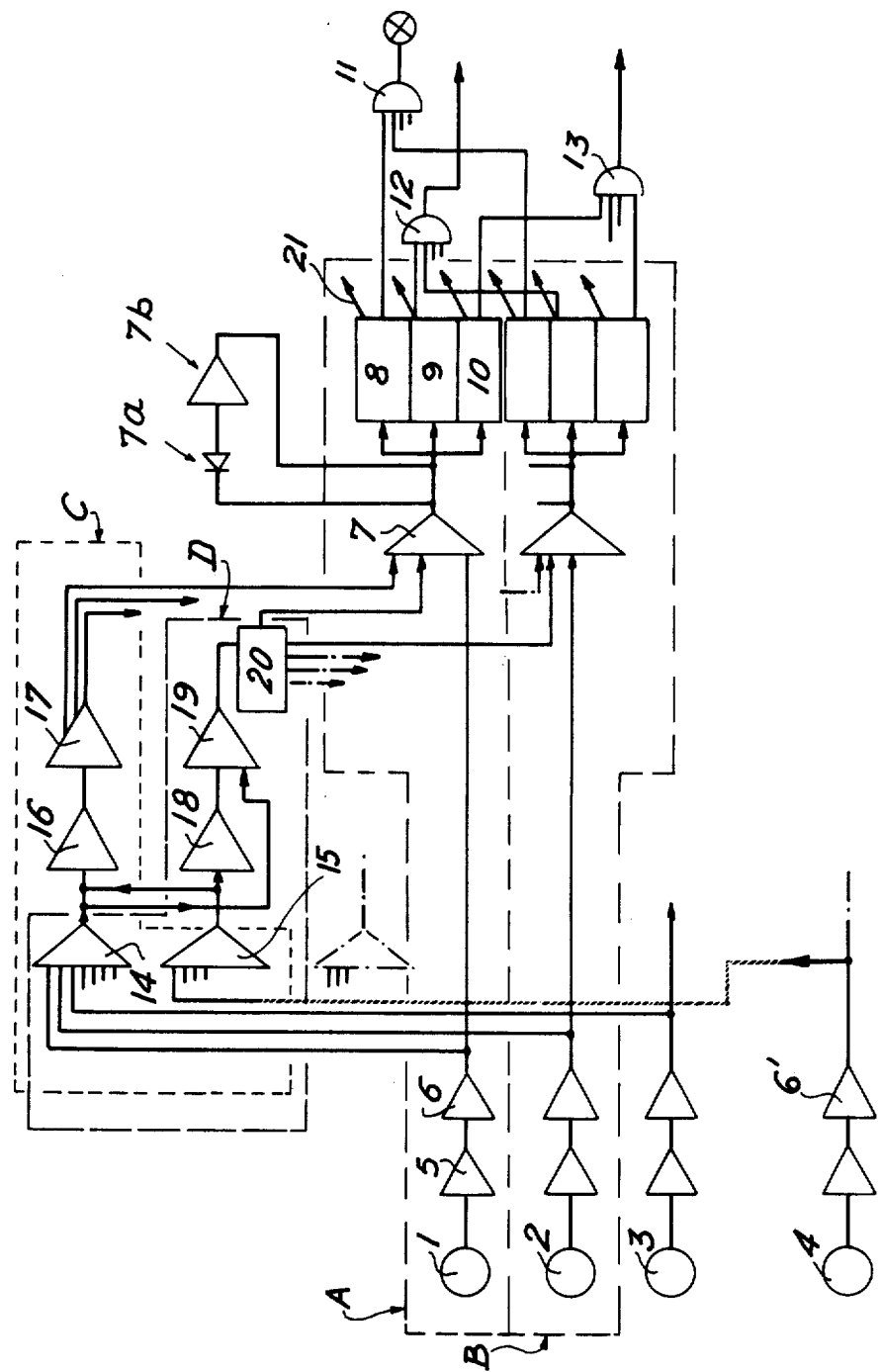

METHOD AND A DEVICE FOR THERMAL MONITORING OF A NUCLEAR REACTOR CORE

This invention is directed to a method of thermal monitoring of a nuclear reactor core and to a monitoring device for carrying out said method.

It is known that, in the case of a nuclear reactor which is in operation, temperature is a physical parameter which has to be checked with care since this latter must not be permitted to depart from a predetermined value at a given monitoring point of the reactor, said parameter being a function of the materials located in the proximity of said monitoring point. Thus the coolant temperatures within the fuel assemblies must always be such that the clad temperature does not exceed a predetermined maximum value under any circumstances.

Prior to the present invention, it was the customary practice to carry out thermal monitoring of a reactor core by means of the temperature rise produced within the coolant at this latter passed through the fuel assemblies by detecting successively on the one hand the temperature of the coolant at a point located upstream of the fuel assemblies and on the other hand the temperatures of the coolant at the outlet of each fuel assembly.

It is worthy of note that the periodic application of this method did not permit fast detection of a possible sudden temperature rise occurring in a fuel assembly between two successive measurements carried out on said fuel assembly and that the accuracy of a method of this type was also liable to be affected when a substantial temperature variation occurred upstream of the fuel assemblies.

The present invention is precisely directed to a method of thermal monitoring of a nuclear reactor core which overcomes the drawbacks mentioned in the foregoing since it has the advantage in particular of permitting continuous monitoring of each reactor fuel assembly.

In more exact terms, the method of thermal monitoring of a reactor core in accordance with the invention and comprising hot, sometimes hereinafter referred to as $T_1$, and cold, sometimes hereinafter referred to as $T_2$, fuel assemblies by utilizing coolant temperatures detected at the outlets of a plurality of fuel assemblies essentially consists:

in establishing at each instant on the one hand the mean core outlet temperature by forming the half-sum of the mean hot ($T_1$) and cold ($T_2$) core outlet temperatures corresponding respectively to the mean value of the coolant temperatures at the outlet of at least part of the hot fuel assemblies and to the mean value of the coolant temperatures at the outlet of at least part of the cold fuel assemblies and, on the other hand, the difference between said mean hot ($T_1$) and cold ($T_2$) core outlet temperatures, in producing for each fuel assembly aforesaid an analog signal corresponding to the temperature difference between the coolant temperature at the outlet of said assembly and the mean core outlet temperature as initially increased or decreased by a predetermined fraction of the difference between the mean hot ($T_1$) and cold ($T_2$) core outlet temperatures in order to define a state of equilibrium at which said temperature difference is equal to zero, in processing said signal in order to ensure that the appropriate safety actions are initiated by overstepping of threshold values corresponding to temperature variations permitted on each side of the equilibrium zero.

The method as defined in the foregoing makes it possible to carry out continuous relative monitoring of the temperatures of a reactor core without entailing the need for continuous comparison with the coolant inlet temperature since it consists in detecting at each instant any potential localized cooling defect in one of the reactor core assemblies by comparison with the cooling at the same instant of the reactor core considered as a whole.

Said zero method consists in continuously comparing the coolant outlet temperature of each of the core monitoring assemblies with the mean outlet temperature of the core considered as a whole by initially establishing an analog state of equilibrium such that the difference between these two compared temperatures is reduced to zero by a fraction of the difference between the mean hot ($T_1$) and cold ($T_2$) core outlet temperatures, the fraction aforementioned being intended to constitute a characteristic parameter of each fuel assembly since said fraction is a function of the position of the fuel assembly considered within the reactor core.

In more exact terms, the method according to the invention can be presented by way of explanation as follows:

if a signal $u_k$ represents the coolant outlet temperature of the $k^{th}$ fuel assembly which is detected for example by a thermocouple at the outlet of said $k^{th}$ assembly, if a signal $u_c$ produced by the analog method from a certain number of signals $u_k$ corresponding to hot fuel assemblies of the reactor core represents the mean hot core outlet temperature, if a signal $u_f$ produced by the analog method from a certain number of signals $u_k$ corresponding to cold fuel assemblies of the reactor core represents the mean cold core outlet temperature, the method consists in following the progressive variation of the signal:

$$E_k = u_k - \frac{u_c + u_f}{2} + c_k(u_c - u_f)$$

where $u_c + u_f/2$ provides a measurement of the mean core outlet temperature $U_M$ and $c_k$, this characteristic of the $k^{th}$ fuel assembly being established at the time of an initial adjustment in order to ensure that the signal $E_k$ is of zero value.

Any cooling fault which occurs in one of the fuel assemblies and modifies the signal $u_k$ to an appreciable extent results in a state of unbalance which, depending on its magnitude, automatically initiates the necessary safety actions such as a pre-alarm, an emergency shutdown or a control rod drop. It is worthy of note that, if the fuel assembly of the order K which is subjected to abnormal cooling takes part in the generation of the signals $U_M$ and $u_c - u_f$, these signals are disturbed only to a slight extent.

The present invention is also directed to a device for carrying out the method in accordance with the invention which comprises in a general manner:

N thermocouples which are equal in number to the number N of reactor core fuel assemblies to be monitored, N measuring channels connected individually to each of the N thermocouples and each comprising in series:

at least one amplifier for the signal detected by the thermocouple, a summing amplifier at the output of the preceding amplifier and also at the output of two associated analog circuits supplied by at least a certain number of the N measuring channels and each comprising means enabling one circuit to deliver a signal corresponding to the opposite value of the mean core outlet temperature and enabling the other circuit to deliver a signal corresponding to the appropriate fraction of the difference between the mean hot ($T_1$) and cold ($T_2$) core outlet temperatures, at the output of said summing amplifier, devices comprising different thresholds for pre-alarm, emergency shutdown and/or control rod drop, each device aforesaid being intended to deliver command signals for appropriate orders by means of at least one regrouping OR-circuit in the event of overstepping of the corresponding threshold.

Further properties and advantages of the invention will become more clearly apparent from the following description of one practical example of the method which is given by way of illustration and not in any limiting sense.

In this example of application of the invention, thermal monitoring of the core of a fast reactor cooled by a liquid metal and especially sodium is carried out in a wholly satisfactory manner and offers a considerable advantage since monitoring of the "hot point" of fuel cans is of major importance in this type of reactor.

The core of a nuclear reactor of this type is described in particular in the June 1973 issue of "Bulletin d'Informations Scientifiques et Techniques" No 182 published by Commissariat a l'Energie Atomique.

The following description is given with reference to the single accompanying FIGURE in which the device in accordance with the invention is illustrated diagrammatically.

It should be noted in addition that, in this description, the expression "fuel assemblies" designates both the assemblies which contain fissile material and the assemblies which contain only fertile material.

This figure shows diagrammatically and to a complete extent only two of the N measuring channels, namely those designated by the references A and B. Each of these N measuring channels is connected to one of the N monitored reactor core assemblies; in consequence, the complete association of the two computing circuits C and D together with all the N measuring channels will be explained in general principle without being completely illustrated.

There are shown at 1, 2, 3 and 4 in the figure four of the N temperature detectors constituted by thermocouples which each supply one of the N measuring channels such as A and B.

Either of said measuring channels is identical in design with the channel A which comprises the following devices in series:

an element for amplifying the measurement previously performed by the thermocouple 1, said element being constituted for example by two cascade-connected amplifiers 5 and 6 which have a suitable gain in order to detect small temperature variations;

a summing amplifier 7 having three inputs to which are applied respectively in accordance with the essential feature of the invention, the signal which has been previously amplified for measuring the outlet temperature of the fuel assembly corresponding to the measuring channel A, the signal produced by the circuit C being such as to correspond to the opposite of the mean reactor core outlet temperature and the signal produced by the circuit D being such as to correspond to the fraction of the difference between the mean hot ($T_1$) and cold ($T_2$) core outlet temperatures so that the signal emitted by said summing amplifier 7 of channel A is initially of zero value;

devices 8, 9 and 10 comprise respectively a threshold for pre-alarm, emergency shutdown and control rod drop constituted for example by open-loop amplifiers which can be actuated by positive or negative signals by means of a diode 7a and an amplifier 7b having a gain of 2 for rectifying the negative polarities, said diode and amplifier being connected in shunt on the output of said summing amplifier 7;

regrouping OR-circuits 11, 12, 13 which trigger the standard safety actions such as pre-alarm, emergency shutdown or a control rod drop when the signals which may be delivered by each of said devices 8, 9 and 10 of each measuring channel which is similar to the channel A are applied respectively to said OR-circuits.

The composition of the computing circuits C and D is directly dependent on the operations to be performed on the basis of two sets of temperatures measured on the one hand on a predetermined number of "hotter" core assemblies and on the other hand by a predetermined number of "colder" core assemblies.

Thus the circuits C and D first have in common two operational amplifiers 14 and 15:

the amplifier 14 for generating a signal corresponding to the mean hot ($T_1$) core outlet temperature being placed at the output of a certain number of measuring amplifiers 6 selected from those which form part of measuring channels such as the channel A which are connected to hot core assemblies;

the amplifier 15 for generating a signal corresponding to the mean cold ($T_2$) core outlet temperature being placed at the output of a certain number of measuring amplifiers 6' selected from those which form part of measuring channels connected to cold core assemblies.

The computing circuit C, the output of which feeds one of the three inputs of the summing amplifier 7 by means of a signal corresponding to the opposite value of the mean core outlet temperature is provided at the output of said amplifiers 14 and 15 with a summing amplifier 16 having a gain of 2:1 followed by an inverting amplifier 17.

The circuit D, the output of which also feeds one of the three inputs of the summing amplifier 7 by means of a signal corresponding to the fraction of the difference between the mean hot and cold core outlet temperatures comprises a summing amplifier 19 followed by an assembly 20 placed at the output of the amplifier 14 for generating the mean hot temperature and at the output of an inverting amplifier 18 which is in turn placed at the output of the amplifier 15 for generating the mean cold temperature. By way of example, the assembly 20 aforesaid is constituted by a series of amplifiers having symmetrical outputs between which are connected N potentiometers for permitting initial adjustment of the fraction of the difference between the mean hot and cold core outlet temperatures in order to ensure that the signal initially emitted by the summing amplifier 7 is zero within each of the N measuring channels.

In this example, the measuring amplifiers 5 and 6 have a gain in the vicinity of 235, the amplifiers having outputs which are symmetrical with the assembly 20 have a gain in the vicinity of 1.5, thus making it possible to obtain a satisfactory signal at the output of the summing amplifier 7. The core of a fast reactor contains about 85 fuel assemblies and it is sufficient to supply each of the operational amplifiers 14 and 15 with groups of 10 signals.

It should finally be pointed out that the arrows such as the arrow 21 shown in the accompanying FIGURE represent diagrammatically a number of different signalling relays which make it possible, for example in the event of overstepping of emergency shutdown thresholds or of a control rod drop, to switch the output of the summing amplifier 7 to an external incident recorder.

It is readily apparent that, at the time of monitoring of the nuclear reactor core, the different means shown diagrammatically in the FIGURE are conveniently arranged within suitable drawers fixed on a synoptic unit. This unit permits initial adjustment of the potentiometers of the assembly 20 as well as the adjustment on the one hand of the pre-alarm and emergency shutdown threshold values combined as a rule by means of a switch having preset voltages delivered by amplifiers in which the output values can be controlled and, on the other hand, the adjustment of the control-rod drop threshold values of the devices 10 which are smaller in number than the core assemblies but can be connected to either of the measuring channels.

The synoptic unit aforesaid also serves to carry out the control operation proper by means of indicator lamps for signals delivered after the regrouping OR-circuits 11, 12, 13 and each pre-alarm device 8 when these latter are supplied. The aforesaid drawers which contain the means shown diagrammatically in the FIGURE are clearly connected to an assembly for collecting all the mesurements of the reactor core thermocouples, to the emergency bays for the transfer of orders for control rod drop and emergency shutdown, and also to the control-room console.

What I claim is:

1. A method of thermal monitoring of a nuclear reactor core having fuel assemblies at temperatures $T_1$ and $T_2$ utilizing coolant temperatures detected at the outlets of a plurality of said fuel assemblies comprising the steps of establishing at each instant the mean core outlet temperature by forming the half-sum of the mean $T_1$ and $T_2$ core outlet temperatures corresponding respectively to the mean value of the coolant temperatures at the outlet of at least part of the fuel assemblies at temperatures $T_1$ and to the mean value of the coolant temperatures at the outlet of at least part of the fueld assemblies at temperatures $T_2$ and the difference between said core outlet temperatures $T_1$ and $T_2$, producing for each fuel assembly an analog signal corresponding to the temperature difference between the coolant temperature at the outlet of said fuel assembly and the mean core outlet temperature as initially increased or decreased by a predetermined fraction of the difference between the mean core outlet temperatures $T_1$ and $T_2$ to define a state of equilibrium at which said temperature difference is equal to zero, and processing said signal to initiate appropriate safety actions by overstepping of threshold values corresponding to temperature variations permitted on each side of the equilibrium zero.

2. A method according to claim 1, wherein said analog signal representing said temperature difference is generated for each fuel assembly aforesaid by forming the sum of three signals representing respectively the temperature of the coolant at the outlet of said fuel assembly, a value of opposite sign value of said mean core outlet temperature and the fraction of said difference between the mean core outlet temperatures $T_1$ and $T_2$ corresponding to the position of said fuel assembly.

3. An electric device for the thermal monitoring of a nuclear reactor core comprising N thermocouples which are equal in number to the number N of reactor core fuel assemblies at temperatures $T_1$ and $T_2$, N measuring channels connected individually to each of the N thermocouples and each comprising in series:

at least one amplifier for the signal detected by the thermocouple, a summing amplifier at the output of the preceding amplifier and also at the output of two analog circuits supplied by at least a certain number of the N measuring channels and each comprising means enabling one circuit to deliver a signal corresponding to a value of opposite sign value of the mean core outlet temperature and enabling the other circuit to deliver a signal corresponding to a fraction of the difference between the mean core outlet temperatures $T_1$ and $T_2$, at the output of said summing amplifier, devices comprising different thresholds for pre-alarm, emergency shutdown and/or control rod drop, each device aforesaid delivering command signals for appropriate orders by at least one regrouping OR-circuit in the event of overstepping of the corresponding threshold value.

4. An electronic device for the thermal monitoring of a nuclear reactor core according to claim 3, wherein said associated analog circuits comprise in common two operational amplifiers for delivering respectively a signal corresponding to the mean core outlet temperature $T_1$ and to the mean core outlet temperature $T_2$, these two amplifiers being each placed at the output of a plurality of said amplifiers for the signals detected by the thermocouples selected as a function of the nature of the mean value to be established.

5. A device for the thermal monitoring of a nuclear reactor core according to claim 4, wherein the associated analog circuit for delivering the characteristic fraction of each fuel assembly of the difference between the mean core outlet temperatures $T_1$ and $T_2$ has successively at the output of said mean temperature $T_1$ amplifier and at the output of an inverting amplifier which is in turn placed at the output of said mean temperature $T_2$ amplifier, a summing amplifier and a series of amplifiers having symmetrical outputs between which are connected N potentiometers for adjusting said difference between the mean core outlet temperatures $T_1$ and $T_2$.

6. An electronic device for the thermal monitoring of a reactor core according to claim 4, wherein said associated analog circuit for delivering the value of opposite sign value of the mean core outlet temperature comprises at the output of said $T_1$ and $T_2$ core outlet temperature a summing amplifier having a gain of 2:1 and an inverting amplifier.

* * * * *